Patented Nov. 30, 1937

2,100,900

UNITED STATES PATENT OFFICE 2,100,900

PRODUCTION OF INTERPOLYMERIZATION PRODUCTS

Hans Fikentscher, Ludwigshafen-on-the-Rhine, and Josef Hengstenberg, Mannheim, Germany, assignors to I. G. Farbenindustrie Aktiengesellschaft, Frankfort-on-the-Main, Germany No Drawing. Application December 7, 1935, Serial No. 53,434. In Germany December 9, 1933

8 Claims. (Cl. 260—2)

This invention relates to the production of valuable, uniform inter-polymerization products.

It is already known that by the polymerization of mixtures of two or more polymerizable unsaturated organic compounds inter-polymerization products are obtained. If the compounds to be polymerized have different speeds of polymerization, instead of uniform inter-polymerization products, non-uniform physical mixtures of the polymerization products of the compounds employed and of inter-polymerization products which differ in their composition with respect to the percentage of the single constituents are obtained.

We have now found that unitary mixed polymerization products can be obtained by the polymerization of at least two polymerizable unsaturated organic compounds of different speeds of polymerization in aqueous emulsion by adding the compound having the higher speed of polymerization at about the rate at which it is used up to the compound having the lower speed of polymerization.

As examples of polymerizable unsaturated organic compounds of a low speed of polymerization vinyl chloride and acrylic acid nitrile may be mentioned, unsaturated compounds of a high speed of polymerization being, for example, acrylic acid, acrylic acid esters and amide, and the homologous compounds such as the methacrylic acid and its esters and amide, and styrene.

The process may be carried out, for example by commencing the polymerization of the more difficultly polymerizable compound with only one fifth of the total amount of the more readily polymerizable compound. As soon as the latter compound has been completely or mainly used up by polymerization, the second fifth is added and so on. The more readily polymerizable compound may also be added in greater or smaller amounts, in the limiting case even continuously.

The progress and prevailing state of the polymerization may be ascertained, for example by determining the dry content or the specific gravity of a sample withdrawn.

The following examples will further illustrate how this invention may be carried out in practice, but the invention is not restricted to these examples. The parts are by weight.

Example 1

0.7 part of alpha-hydroxy-octodecane sulphonic acid sodium salt, 0.4 part of 30 per cent hydrogen peroxide and 0.006 part of concentrated formic acid are dissolved in 60 parts of water in a closed enameled rotary tubular boiler, and 17.7 parts of monomeric vinyl chloride and 0.35 part of monomeric acrylic acid methyl ester are added, the whole being kept in motion, for example by stirring or by revolving the reaction vessel. Samples are withdrawn from time to time from the aqueous dispersion which is being formed, and their specific gravity at 20° C. is determined by means of a hydrometer. As soon as the specific gravity of the dispersion has increased due to the proceeding polymerization to the values 1.015, 1.026, 1.037, 1.048 and 1.059 respectively, there is added on each occasion 0.24 part of acrylic acid methyl ester. After about 20 hours with an internal temperature of from 44° to 47° C. and with an initial pressure of from 6 to 7 atmospheres, the polymerization is completed, the pressure falling to atmospheric pressure. The product is coagulated with a dilute solution of aluminium sulphate, the pulp-like coagulate is heated to from 70° to 80° C. in about 0.5 per cent caustic soda solution and the coagulate is centrifuged washed and dried. A white thermoplastic powder having a chlorine content of 49.5 per cent is obtained. The samples withdrawn when a specific gravity of 1.026, 1.037, 1.048, and 1.059 have been reached, show chlorine contents of 49.0, 49.0, 49.6 and 49.2 per cent, an indication of the homogeneous composition of the resulting inter-polymerization product.

Example 2

A solution of 0.84 part of alpha-hydroxy-octodecane sulphonic acid sodium salt, 0.6 part of 30 per cent hydrogen peroxide and 0.006 part of concentrated formic acid in 60 parts of water is introduced into a closed enameled rotary tubular boiler, and 15.2 parts of monomeric vinyl chloride and 1 part of monomeric acrylic acid methyl ester are then added, the reaction vessel being kept in motion. Samples of the liquid are withdrawn from time to time the specific gravity at 20° of which is determined by means of a hydrometer. As soon as the liquid has the specific gravity of 1.015, 1.025, 1.035 and 1.045, there is added on each occasion 0.7 part of acrylic acid methyl ester and when the specific gravity is 1.055, 0.56 part of acrylic acid methyl ester is added. The polymerization is completed within from about 20 to 30 hours with an internal temperature of from 50° to 52° C. and an initial pressure of from 8 to 11 atmospheres, the pressure falling during the process to atmospheric pressure. The product is worked up in the usual manner and a white thermoplastic powder having a chlorine content of 42.6 per cent is obtained. The samples withdrawn when a specific gravity of 1.035, 1.045, and 1.055 have been reached show chlorine contents of 41.5, 41.6, and 42 per cent.

Example 3

A solution containing 45 parts of alpha-hydroxy-octodecane sulphonic acid sodium salt, 30 parts of 30 per cent hydrogen peroxide and 7.5 parts of an 8 per cent solution of peracetic acid in glacial acetic acid in 4500 parts of water is introduced into an enameled vessel provided with a stirrer and a reflux condenser, and 600 parts of acrylic acid nitrile and 100 parts of styrene are added, while stirring. The emulsion thus formed is then boiled under reflux with further stirring. The specific gravity at 70° C. is 0.942. Samples of the liquid are withdrawn from time to time. As soon as the liquid has the specific gravity of 0.950 (at 71° C.), 0.960 (at 72° C.) 0.970 (at 75° C.), 0.976 (at 78° C.), 0.982 (at 82° C.), there are added on each occasion 100 parts of styrene. The polymerization is completed within about 4 hours with an internal temperature of from 70° to 95° C. The product obtained by coagulation is then washed and dried. The samples withdrawn when a specific gravity of 0.952, 0.960, 0.970, 0.976 and 0.982 have been reached have nitrogen contents of 10.6, 11.5, 11.3, 12.3 and 11.4 per cent. The nitrogen content of the final product is 12.5 per cent corresponding to an amount of about 47 per cent of acrylic acid nitrile in the inter-polymerization product.

Example 4

In a pressure-tight vessel provided with a stirrer and a reflux condenser 45 parts of vinyl chloride are emulsified, while stirring, in 160 parts of water containing 1.7 parts of alpha-hydroxy-octodecane sulphonic acid sodium salt, 0.9 part of sodium pyrophosphate and 0.12 part of ammonium persulphate. The emulsion obtained is warmed to 50° C. and 20 parts of a 20 per cent aqueous solution of methacrylic acid amide is dropped in during the course of the polymerization (which lasts about 30 hours) as uniformly as possible. The rate at which the methacrylic acid amide solution is dropped into the polymerization mixture is regulated according to the rate at which the specific gravity of this mixture rises from 1.008 at the beginning to 1.053 at the end of the polymerization. Under such conditions of working the concentration of the monomeric methacrylic acid amide remains constant in the aqueous solution. An aqueous dispersion of a uniform inter-polymerization product of vinyl chloride and methacrylic acid amide is thus obtained which is worked up in the manner described in Example 1. It is very suitable for the production of films, foils, masses for insulating and covering cables and for similar purposes.

Example 5

In a pressure-tight vessel provided with a stirrer and a reflux condenser 11.15 parts of vinyl chloride are emulsified, while stirring, in 60 parts of water containing 0.9 part of alpha-hydroxy-octodecane sulphonic acid sodium salt and 0.036 part of ammonium persulphate. The emulsion thus obtained is warmed to about 50° C. and 5.4 parts of methacrylic acid methyl ester are added a little at a time as uniformly as possible during the whole course of the polymerization. The rate at which it is added is regulated according to the rate at which the specific gravity of the emulsion rises from 1.002 at the beginning to 1.052 at the end of the polymerization. An aqueous dispersion of a uniform inter-polymerization product of vinyl chloride and methacrylic acid methyl ester is thus obtained having a chlorine content of 35.5 per cent corresponding to 62.5 per cent vinyl chloride. The product, after having been worked up in the manner described in Example 1, has a softening point of 84° C., which is by 6° higher than that of polyvinyl chloride itself.

When working on a technical scale it is advantageous to add also the vinyl chloride in portions during the course of polymerization, but it is necessary that the vinyl chloride is always present in an excess calculated with regard to the second component which is added in small portions at the rate at which it is used up. The composition of the inter-polymerization product obtained in this manner is the same as that of the product described above.

What we claim is:

1. In the production of inter-polymerization products by polymerizing in an aqueous emulsion at least two polymerizable unsaturated organic compounds of different speeds of polymerization the step which comprises adding the compound having the higher speed of polymerization at about the rate at which it is used up to the compound having the lower speed of polymerization.

2. In the production of inter-polymerization products by polymerizing in an aqueous emulsion at least two polymerizable unsaturated organic compounds of different speeds of polymerization the step which comprises adding the compound having the higher speed of polymerization in small portions at about the rate at which it is used up to the compound having the lower speed of polymerization.

3. In the production of inter-polymerization products by polymerizing in an aqueous emulsion at least two polymerizable unsaturated organic compounds of different speeds of polymerization the step which comprises adding the compound having the higher speed of polymerization continuously at about the rate at which it is used up to the compound having the lower speed of polymerization.

4. In the production of inter-polymerization products by polymerizing in an aqueous emulsion at least two polymerizable unsaturated organic compounds of different speeds of polymerization the step which comprises adding the compound having the higher speed of polymerization continuously to the compound having the lower speed of polymerization at such a rate that the concentration of the monomeric compound having the higher speed of polymerization remains constant relative to the amount of water employed.

5. In the production of inter-polymerization products by polymerizing in an aqueous emulsion vinyl chloride together with acrylic acid methyl ester the step which comprises adding the acrylic acid methyl ester at about the rate at which it is used up to the vinyl chloride.

6. In the production of inter-polymerization products by polymerizing in an aqueous emulsion vinyl chloride together with methacrylic acid methyl ester the step which comprises adding the methacrylic acid methyl ester at about the rate at which it is used up to the vinyl chloride.

7. In the production of inter-polymerization products by polymerizing in an aqueous emulsion vinyl chloride together with methacrylic acid amide the step which comprises adding the methacrylic acid amide at about the rate at which it is used up to the vinyl chloride.

8. In the production of inter-polymerization products by polymerizing in an aqueous emulsion vinyl chloride together with a compound of the group consisting of acrylic and methacrylic compounds having a higher speed of polymerization than that of the vinyl chloride, the step which comprises adding the compound of the acrylic acid series at about the rate at which it is used up to the vinyl chloride.

HANS FIKENTSCHER.
JOSEF HENGSTENBERG.